United States Patent [19]

Federl et al.

[11] Patent Number: 4,588,773

[45] Date of Patent: May 13, 1986

[54] ANTISTATIC THERMOPLASTIC COMPOSITION

[75] Inventors: Alan R. Federl; George P. Kipouras, both of Parkersburg, W. Va.

[73] Assignee: Borg-Warner Chemicals, Inc., Parkersburg, W. Va.

[21] Appl. No.: 685,091

[22] Filed: Dec. 21, 1984

[51] Int. Cl.$^4$ .................. C08L 55/02; C08L 71/02; C08L 71/00

[52] U.S. Cl. ....................... 525/64; 525/187

[58] Field of Search ................. 525/187, 64

[56] References Cited

U.S. PATENT DOCUMENTS

| | | | |
|---|---|---|---|
| 3,351,517 | 11/1967 | Willis | 525/187 |
| 3,425,981 | 2/1969 | Puletti et al. | 260/41 |
| 3,445,544 | 5/1969 | Schmitt | 260/876 |
| 3,450,794 | 6/1969 | Ebneth et al. | 260/876 |
| 3,639,651 | 2/1972 | Komuro et al. | 260/23.7 M |
| 3,657,393 | 4/1972 | Komuro et al. | 260/887 |
| 3,674,893 | 7/1972 | Nowak et al. | 260/836 |
| 3,864,426 | 2/1975 | Salensky . | |
| 3,923,922 | 12/1975 | Grant | 260/2.5 EP |
| 4,048,261 | 9/1977 | Starmer | 260/888 |
| 4,315,081 | 2/1982 | Kabayashi et al. | 525/64 |
| 4,408,013 | 10/1983 | Barnhouse | 525/187 |
| 4,466,912 | 8/1984 | Phillips et al. | 252/512 |

FOREIGN PATENT DOCUMENTS 0103296 3/1984 European Pat. Off. .
1250926 3/1960 France .

OTHER PUBLICATIONS

B. F. Goodrich, "Hydrin Elastomers", p. 20.

Primary Examiner—Carman J. Seccuro
Attorney, Agent, or Firm—Emily A. Richeson

[57] ABSTRACT

An antistatic thermoplastic composition is provided wherein the composition comprises less than 80% by weight of an ABS graft copolymer, and more than 20% by weight of an epihalohydrin copolymer.

11 Claims, No Drawings

ANTISTATIC THERMOPLASTIC COMPOSITION

BACKGROUND OF THE INVENTION

The present invention relates generally to thermoplastic, ABS-containing compositions which exhibit antistatic properties. More specifically, the present invention relates to antistatic compositions which include graft ABS copolymers and an epihalohydrin rubber.

Graft ABS copolymers have gained acceptance for a wide range of applications, such as computer housings, refrigerator linings and toys, due to their high impact strength, tensile strength and hardness combined with thermoplastic properties. However, most thermoplastic ABS compositions exhibit relatively slow electrostatic charge dissipation rates which make them unacceptable for many applications, such as certain medical devices and military equipment, wherein rapid dissipation of static electrical charge is required.

One method of reducing electrostatic charge retention is to coat the article, after molding, with materials which leave an antistatic film. While this may provide adequate antistatic properties temporarily, surface films tend to be worn off during use of the article, so that the film must be periodically reapplied or the antistatic properties are lost. This method also has the disadvantage of adding another step, e.g. coating, to the article manufacturing process, thereby increasing costs.

Another method of reducing static charge retention is that of incorporating a material with antistatic properties into the composition. One type of internal antistatic additive, such as ethoxylated amine chemicals, absorbs water from the air, thereby lowering the surface resistance of the composition. Unfortunately, however, this absorption process is reversed in dry environments, causing the antistatic property to diminish or be lost completely when the air surrounding the article is dry. These materials also tend to bloom to the surface of the article, where they are removed by wear.

Other additives used to reduce static charge retention are homopolymers and copolymers of ethylene oxide, such as epichlorohydrin rubber. Such polymers may be used as antistatic ingredients in plastics like polyvinyl chloride and other similar materials. U.S. Pat. No. 3,425,981 discloses a composition which includes an ethylene oxide homopolymer or copolymer in addition to an ethylene polymer resin. Suitable ethylene oxide copolymers contain ethylene oxide as the predominant monomer together with monomers having a single epoxy group, such as propylene oxide, butylene oxide and styrene oxide.

Certain antistatic compounds have also been added to ABS compositions in order to improve the electrostatic charge dissipation properties of the material. U.S. Pat. No. 3,450,794 to Ebneth, et al. discloses an antistatic thermoplastic composition which includes a graft copolymer of styrene and acrylonitrile on a conjugated diolefin, such as polybutadiene, a thermoplastic copolymer of a styrene and an acrylonitrile, blended with 1 to 10% by weight of a polypropylene glycol. This composition is reported as having a charge dissipation half life as low as 280 sec. However, this dissipation rate is not sufficient for many applications.

In summary, known means of imparting antistatic properties to plastics may have the disadvantages of diminishing with wear, leach from the thermoplastic by water or other solvents, exhibiting inadequate charge dissipation rates or having dissipation rates which are dependent on the amount of moisture present in the surrounding atmosphere. However, due to the pervasive use of plastic materials, a great need exists for durable, highly conductive antistatic thermoplastic materials. This problem is particularly acute with ABS thermoplastics which are in great demand due to their favorable physical properties, yet are such efficient insulators that they may be used in some applications to support live electrical parts.

SUMMARY OF THE INVENTION

The present invention is an antistatic thermoplastic composition which comprises less than 80% by weight of an ABS graft copolymer and more than 20% by weight of an epihalohydrin copolymer. More particularly, the ABS graft copolymer includes at least 40% by weight of a combination of a vinyl aromatic compound and an acrylonitrile compound, and 60% or less by weight of a rubber substrate. It is further preferred that the epihalohydrin copolymer is a copolymer of epichlorohydrin and an alkylene oxide, such as ethylene oxide, propylene oxide and mixtures thereof.

DETAILED DESCRIPTION

The present invention is an antistatic thermoplastic composition which comprises less than 80% by weight of an ABS graft copolymer and more than 20% by weight of an epihalohydrin copolymer.

Although originally the term "ABS" denoted a copolymer primarily constructed from acrylonitrile, butadiene and styrene, this definition has been expanded in recent years to include copolymer resins in which these components have been replaced in whole or in part by closely analogous compounds.

The vinyl aromatic compound useful in the present invention may be any of a variety of copolymerizable vinyl aromatic compounds, such as alpha-methyl styrene, halogenated styrenes such as chlorostyrene and dibromostyrene, alkyl styrenes such as vinyl toluene, vinyl anilines and styrene. Mixtures of different vinyl aromatic compounds may also be used. It is preferred, however, that the vinyl aromatic compound be selected from the group consisting of styrene, halogenated styrenes, alpha-methyl styrenes, alkyl styrenes and mixtures thereof. In the embodiment which is most preferred, the graft copolymer includes at least some styrene.

The acrylonitrile compound useful in the present invention is any copolymerizable acrylonitrile compound, such as acrylonitrile, halogenated acrylonitriles, methacrylonitrile, ethacrylonitrile, further alkyl acrylonitrile derivatives, and mixtures thereof. Other non-nitrilated acrylic compounds, such as methacrylate, methyl methacrylate, ethylacrylate and acrolein, may be present in relatively small amounts, constituting less than 20% by weight, and preferably less than 10% by weight, of the ABS graft copolymer. Acrylonitrile and/or methacrylonitrile are preferred. Most preferably, at least some acrylonitrile is included, such as in ABS graft copolymers which contain acrylonitrile as the principle acrylic compound while including a lesser amount of methacrylonitrile.

The rubber substrate may be any of a variety of rubber substrates known in the art. However, preferred rubbers are those which include a diene rubber. Particularly preferred rubbers are polybutadiene rubbers and butadiene copolymer rubbers, such as copolymers of butadiene containing up to 35% of a copolymerizable monomer such as an acrylonitrile, an alkyl acrylate, an alkyl methacrylate or a vinyl aromatic monomer such as styrene. Alternatively, although less preferred than diene rubbers, other rubber substrates may be employed. Alternative materials include rubbers such as acrylic rubbers derived from alkyl acrylate homopolymer or copolymers, and normally including small amounts of di- or tri-functional crosslinking and graft linking monomers.

As is known in the art, the graft copolymers of the present invention may also include minor amounts of various additives to improve the properties of the resin. Such additives include crosslinking monomers such as divinyl benzene, ethylene glycol dimethacrylate and the like.

A great many of these graft copolymers are widely available commercially, or may be prepared according to any of a variety of known graft polymerization techniques. One such method involves copolymerizing the acrylonitrile monomer and the vinyl aromatic monomer in the presence of the previously formed rubber substrate. Typical methods for preparing traditional ABS graft polymers from styrene and acrylonitrile are found in U.S. Pat. No. 3,238,275. Also included in the invention as ABS graft copolymers are ABS-type resins prepared by blending a graft copolymer having a high rubber substrate content with a preformed rigid copolymer, such as a styrene-acrylonitrile copolymer (SAN), an acrylonitrile-alphamethylstyrene, styrene copolymer or the like.

The proportion of vinyl aromatic compound, acrylonitrile compound and rubber substrate will depend in part on the characteristics desired in the thermoplastic composition. It is preferred, however, that the ABS graft copolymer include at least 40% by weight of a combination of a vinyl aromatic and an acrylonitrile compound, and 60% or less by weight of a rubber substrate. More preferably, the ABS graft copolymer includes at least 50% by weight of a combination of a vinyl aromatic compound and an acrylonitrile compound, and 50% or less by weight of a rubber substrate.

The antistatic thermoplastic composition of the present invention also includes more than 20% by weight of an epihalohydrin copolymer. The maximum proportion of epihalohydrin copolymer to be included will depend in part on the characteristics of the particular epihalohydrin copolymer and the intended use for the composition. Usually, amounts of 55% by weight or less epihalohydrin copolymer in the composition are preferred. For most uses, however, the proportion of epihalohydrin copolymer usually will not exceed about 50% by weight.

Epihalohydrin monomers may be generally described by the formula:

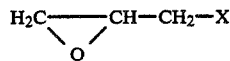

Wherein X is chlorine, bromine or iodine. Preferably, however, X is chlorine or bromine, with epichlorohydrin being most preferred.

The epihalohydrin may be copolymerized with any of a variety of other known, copolymerizable monomers which have an oxirane group. Such monomers include glycidyl ethers, monoepoxides of dienes and polyenes, glycidyl esters and alkylene oxides. Examples of such monomers include vinyl glycidyl ether, isopropenyl glycidyl ether, butadiene monoxide, chloroprene monoxide, 3,4-epoxy-1-pentene, glycidyl acrylate, glycidyl methacrylate, 1,2-epoxy-3,3,3-trichloropropane, phenyl glycidyl ether, ethylene oxide, propylene oxide and trichlorobutylene oxide.

Preferably, the monomer is an alkylene oxide such as ethylene oxide, propylene oxide, butylene oxide, 3,4-epoxy-1-pentene, 1,2-epoxy-3,3,3-trichloropropane, trichlorobutylene oxide and the like. More preferably, the alkylene oxide is ethylene oxide, propylene oxide or mixtures thereof. Ethylene oxide is most preferred.

In the preferred embodiment, the epihalohydrin and the alkylene oxide are copolymerized to form a epihalohydrin rubber prior to combination with the ABS graft copolymer. Suitable epihalohydrin copolymers are available commercially or may be prepared from known, commercially available monomers using known techniques.

In the preferred embodiment, the epihalohydrin copolymer includes about 25% to about 75% by weight epihalohydrin, and about 75% to about 25% by weight of another monomer. More preferably, however, the copolymer includes about 40% to about 60% by weight epihalohydrin and about 60% to about 40% by weight of another monomer, which is preferably an alkylene oxide.

The ABS graft copolymer and the epihalohydrin rubber may be combined by any of a variety of known techniques, such as mixing in a Banbury mixer, melt blending, extrusion and milling. Preferably a small amount of crosslinking agent, such as dicumylperoxide, is included. Other known additives, such as impact modifiers, pigments, lubricants, stabilizers, fillers and antioxidants may also be included.

SPECIFIC EMBODIMENTS

The following Examples relate to testing of blends of various proportions of an epihalohydrin rubber and an ABS graft copolymer according to Federal Test Method Standard 101, Method 4046. This method involves applying an electrical charge to a sample and measuring the decay rate of the sample's charge.

The epihalohydrin copolymer considered in these examples is a 50/50 copolymer of epichlorohydrin and ethylene oxide. The ABS material is a 30/15/55 A/B/S graft copolymer prepared using known emulsion polymerization and grafting techniques. Blends of ABS and epihalohydrin copolymer also contained up to 2% lubricating and stabilizing additives.

Samples are Banbury mixed and milled, then compression molded at 330° F. to dimensions of 125 mils. thick, 3.5 inches wide and 5 inches long. Samples are then conditioned for 24 hours at 15% relative humidity (RH) and 73° F. Samples are then tested according to Method 4046 using a static decay meter. This device applies a 5000 volt charge to the sample and then monitors the time the sample takes to dissipate this charge down to zero volts.

Comparative Examples C1 and C10 represent samples wherein, respectively, no epihalohydrin copolymer or no ABS graft copolymer is included. Comparative Examples C2–C5 represent samples containing an epihalohydrin copolymer in addition to ABS, but wherein the relative proportion of epihalohydrin copolymer is 20% or less. Examples 6–9 represent various embodiments of the invention, wherein the samples include more than 20% by weight of an epihalohydrin copolymer and less than 80% by weight ABS graft copolymer. The results of this testing are represented below in Table I. All percentages are percent by weight based upon the combined weight of the epihalohydrin copolymer and ABS.

TABLE I

| Ex. | % Epihalohydrin Copolymer | % ABS | Charge Dissipation from 5000 Initial Volts (Seconds) | |
|---|---|---|---|---|
| | | | To 500 Volts | To Zero Volt |
| C1 | 0 | 100 | >100 | >100 |
| C2 | 6 | 94 | 25.0 | >100 |
| C3 | 10 | 90 | 11.0 | 60.0 |
| C4 | 15 | 85 | 7.0 | 45.0 |
| C5 | 20 | 80 | 1.2 | 20.0 |
| 6 | 25 | 75 | .03 | .3 |
| 7 | 30 | 70 | .01 | .2 |
| 8 | 35 | 65 | .01 | .2 |
| 9 | 50 | 50 | .01 | .05 |
| C10 | 100 | 0 | .01 | .01 |

As a comparison of Comparative Examples C2-C5 with Examples 6-9 indicates, samples embodying the present invention have substantially faster charge dissipation rates than other analogous ABS graft copolymer/epihalohydrin copolymer blends which do not embody the invention, thereby making the compositions of the present invention suitable for many uses wherein other compositions are not. For example, military specification MIL-B-81705B requires that the charge decay rate from 5000 volts to zero volts be less than 2.0 seconds. As is apparent from the above data, compositions of the present invention may clearly meet this criterion.

Example 11 represents data regarding the physical properties of a blend of 75% ABS and 25% of a 50/50 ethylene oxide/epichlorohydrin copolymer, as described above these data are presented below in Table II. Testing referenced in Table II is according to ASTM procedures, with the letters "RT" indicating room temperature (e.g. approximately 25° C.).

TABLE II
(Example 11)

| SAMPLE PREPARATION (molding) | ASTM Test | |
|---|---|---|
| injection | IZOD IMPACT (FT-LBS/INCH), RT | 4.5 |
| injection | IZOD IMPACT (FT-LBS/INCH), −10° F. | 1.0 |
| injection | TENSILE STRENGTH (PSI), RT | 4,000.0 |
| injection | TENSILE MODULUS (PSI × $10^5$), RT | 2.7 |
| injection | FLEXURAL STRENGTH (PSI), RT | 6,000.0 |
| injection | FLEXURAL MODULUS (PSI × $10^5$), RT | 2.6 |
| compression | SPECIFIC GRAVITY | 1.10 |
| compression | HDT($\frac{1}{4}$ × $\frac{1}{2}$ CM) 264 PSI UNANNEALED | 180.0° F. |

Samples may also be tested for resistance to loss of antistatic properties when exposed to solvents. Comparative Examples C12 and C13 represent samples of known antistatic blends. These blends are ABS with 8-10% by weight ethoxylated amine for Comparative Example C12, and polyethylene with 6% by weight ethoxylated amine for Comparative Example C13. Example 14 represents an antistatic thermoplastic composition of the present invention of 75% by weight ABS and 25% epichlorohydrin/ethylene oxide copolymer as described above for Example 11. Samples for Comparative Examples C12 and C13 and Example 14 are prepared by injection molding. Examples 11 and 14 reflect that a slight variation in dissipation rate may result from sample preparation by compression molding versus injection molding.

Testing is performed by measuring the charge dissipation rate of the sample, as described above. The surface of the sample is thoroughly wiped with a cotton pad saturated with isopropyl alcohol, a common hospital cleaning agent, and conditioned at 10% relative humidity for 24 hours. After cleaning and conditioning the charge dissipation rate is measured again. Results of this testing are reported below in Table III.

TABLE III

| EX | MATERIAL | DISSIPATION RATE (SEC) 5000 Volts to Zero Volts | |
|---|---|---|---|
| | | INITIAL | AFTER SOLVENT CLEANING |
| C12 | ABS/Ethoxylated Amine | 3.4 | >20 |
| C13 | Polyethylene/Ethoxylated Amine | .32 | >20 |
| 14 | ABS with Ethylene Oxide/Epichlorohydrin Copolymer | .70 | .70 |

These examples have been presented only to demonstrate operability and certain aspects of the present invention. The scope of the present invention is not limited to these above embodiments, but includes equivalent embodiments and modifications as defined by the following claims.

We claim:
1. An antistatic thermoplastic composition consisting essentially of:
   (A) less than 80% by weight of an ABS graft copolymer consisting essentially of:
      (i) at least 40% by weight of a vinyl aromatic compound and an acrylonitrile compound;
      (ii) 60% or less by weight of a rubber substrate; and
   (B) more than 20% by weight of an epihalohydrin copolymer.
2. The composition of claim 1 wherein the ABS graft copolymer includes at least 50% by weight of a combination of a vinyl aromatic compound and an acrylonitrile compound, and up to 50% by weight of a rubber substrate.
3. The composition of claim 1 wherein the ABS graft copolymer includes an acrylonitrile compound selected from the group consisting of acrylonitrile, methacrylonitrile, and mixtures thereof.
4. The composition of claim 3 wherein the ABS graft copolymer includes a vinyl aromatic compound selected from the group consisting of styrene, halogenated styrenes, alpha-methyl styrenes, alkyl styrenes and mixtures thereof.
5. The composition of claim 4 wherein the ABS graft copolymer includes a rubber substrate which includes a diene rubber.
6. The composition of claim 1 wherein the epihalohydrin is copolymerized with an alkylene oxide.
7. The composition of claim 6 wherein the alkylene oxide is selected from the group consisting of ethylene oxide, propylene oxide and mixtures thereof.

8. The composition of claim 6 wherein the epihalohydrin is epichlorohydrin.

9. The composition of claim 6 wherein said copolymer of said epihalohydrin and said alkylene oxide includes about 25% to about 75% by weight of said epihalohydrin and about 25% to about 75% of said alkylene oxide.

10. The composition of claim 9 wherein said copolymer of said epihalohydrin and said alkylene oxide includes about 40% to about 60% by weight of said epihalohydrin and about 40% to about 60% of said alkylene oxide.

11. An antistatic thermoplastic composition consisting essentially of:

(A) less than 80% by weight of a graft copolymer consisting essentially of at least 50% by weight of a combination of an acrylonitrile compound which is at least one of acrylonitrile and methacrylonitrile, and a vinyl aromatic compound selected from the group consisting of styrene, halogenated styrenes, alpha-methyl styrenes, alkyl styrenes and mixtures thereof, and up to 50% by weight of a substrate containing a diene rubber; and (B) more than 20% by weight of a copolymer of about 40% to about 60% by weight epichlorohydrin and about 40% to about 60% by weight of an alkylene oxide selected from the group consisting of ethylene oxide, propylene oxide and mixtures thereof.

* * * * *